United States Patent
Brandenburger et al.

(10) Patent No.: US 10,447,467 B2
(45) Date of Patent: Oct. 15, 2019

(54) REVOCABLE PKI SIGNATURES

(71) Applicant: International Business Machines Corporation, Armonk, NY (US)

(72) Inventors: Marcus Brandenburger, Zürich (CH); Franz-Stefan Preiss, Zürich (CH); Kai Samelin, Rueschlikon (CH); Dieter M. Sommer, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 15/146,707

(22) Filed: May 4, 2016

(65) Prior Publication Data

US 2017/0324545 A1    Nov. 9, 2017

(51) Int. Cl.
*H04L 9/32* (2006.01)
*H04L 9/00* (2006.01)
*H04L 29/06* (2006.01)

(52) U.S. Cl.
CPC ............ *H04L 9/006* (2013.01); *H04L 9/3257* (2013.01); *H04L 9/3268* (2013.01); *H04L 63/06* (2013.01); *H04L 63/0823* (2013.01)

(58) Field of Classification Search
CPC ....... H04L 9/0006; H04L 9/14; H04L 9/3247; H04L 9/3263; H04L 63/06; H04L 63/0823
USPC ........................................................ 713/156
See application file for complete search history.

(56) References Cited

U.S. PATENT DOCUMENTS

| | | | |
|---|---|---|---|
| 7,028,181 B1 | 4/2006 | McCullough et al. | |
| 7,373,503 B2 | 5/2008 | Nakano | |
| 7,437,551 B2 | 10/2008 | Chan | |
| 8,032,744 B2 | 10/2011 | Doonan | |
| 8,635,449 B2 | 1/2014 | Sato | |
| 9,118,486 B2 | 8/2015 | Pritikin | |
| 2002/0029337 A1* | 3/2002 | Sudia ................... G06Q 20/401 | 713/176 |
| 2002/0108042 A1* | 8/2002 | Oka ......................... H04L 9/14 | 713/175 |
| 2007/0043949 A1* | 2/2007 | Bugbee ................. H04L 9/3247 | 713/176 |
| 2009/0063854 A1* | 3/2009 | Parkinson ............... H04L 63/20 | 713/158 |
| 2009/0175442 A1* | 7/2009 | Feng ....................... G06F 21/10 | 380/28 |

(Continued)

OTHER PUBLICATIONS

Juang et al, Partially blind threshold signatures based on discrete logarithm, Jan. 15, 1999, Elsevier, vol. 22, all.*

(Continued)

*Primary Examiner* — Ashokkumar B Patel
*Assistant Examiner* — William B Jones
(74) *Attorney, Agent, or Firm* — Daniel P. Morris; Otterstedt, Wallace & Kammer, LLP

(57) ABSTRACT

In a computer-implemented method for signing a message by a user device of a public key infrastructure (PKI) system, the message and a user public key are sent to at least one attestation server and a server signature on the message is received from the attestation server. The server signature attests the validity of the user public key and is bound to the user public key and the message. The message and the server signature are signed with a user private key, thereby providing a user signature on the message. An attestation server and a related computer program product are also provided.

18 Claims, 6 Drawing Sheets

(56) References Cited

U.S. PATENT DOCUMENTS

2011/0087887 A1* 4/2011 Luft ................ H04L 9/3247
 713/178

OTHER PUBLICATIONS

Ganan, C. et al, "A Modeling of Certificate Revocation and Its Application to Synthesis of Revocation Traces" IEEE Date of Publication: Jul. 23, 2012. pp. 1673-1686 (abstract only).

Yinxia Sun et al, "Revocable Identity-Based Signature without Pairing". IEEE, Intelligent Networking and Collaborative Systems (INCoS), 2013 5th International Conference on Sep. 9-11, 2013, pp. 363-365 (abstract only).

Securing certificate revocation lists. Downloaded from http://www.ibm.com/support/knowledgecenter/SSYJCD_1.0.0/com.ibm.help.meigV100.doc/com.ibm.help.meg.securing.doc/Welcome_meg_securing_crls.html?lang=en on May 3, 2016. p. 1.

"Blind signatures for untraceable payments", David Chaum, Ronald L. Rivest, and Alan T. Sherman, editors, Advances in Cryptology: Proceedings of 7 CRYPTO '82, Santa Barbara, California, USA, Aug. 23-25, 1982., pp. 199-203, Plenum Press, New York, 1982.

Sherman S. M. Chow, Lucas Chi Kwong Hui, Siu-Ming Yiu, and K. P. Chow in "Two improved partially blind signature schemes from bilinear pairings" in Colin Boyd and Juan Manuel Gonzalez Nieto, editors, Information Security and Privacy, 10th Australasian Conference, ACISP 2005, Brisbane, Australia, Jul. 4-6, 2005, Proceedings, vol. 3574 of Lecture Notes in Computer Science, pp. 316-328, Springer, 2005.

* cited by examiner

REVOCABLE PKI SIGNATURES

BACKGROUND

The present invention relates to a computer-implemented method for signing a message by a user device of a public key infrastructure (PKI) system. The present invention further relates to a corresponding attestation server and a corresponding computer program product.

The de-facto technique for authenticating messages are digital signatures. Digital signatures allow the holder of a private key to generate a signature which can be verified using the corresponding public key. Such digital signatures are based on the property that no one except the holder of the private key can generate signatures that are valid under the public key. Digital signatures may be used e.g. during TLS client authentication and server authentication, for signing contracts and for e-mails.

To verify that a given public key belongs to a given entity, public key certificates may be used. Such certificates effectively bind a public key to a given entity. A certificate may be generated by a trusted authority of a PKI-system. The trusted authority, which is often denoted as certificate authority, issues a signature on the public key of the respective entity and on additional attributes corresponding to this entity, e.g., the name, the address and/or its affiliation. This signature, together with the information to verify it, then acts as the certificate.

In order for the digital certificate system to be secure, the private key of the signer must be kept secret. If the private key gets compromised, e.g., if a computer has been infected by malware, or a smart phone is lost, the certificate on the corresponding public key has to be revoked. This means that the certificate issued beforehand is not valid anymore and a verifier will reject a signature signed under the corresponding public key. The revocation may be done by informing the issuer of the certificate (certificate authority) and requesting a revocation of the certificate. The certificate authority may publish certificate revocation lists.

To verify a signature, a verifier must determine the validity of both the certificate and the signature itself. Hence usually a public key certificate is sent along with the corresponding digital signature. The verifier may determine whether a certificate is still valid by asking the certificate authority whether the certificate has been revoked and/or by checking revocation lists that have been published by the certificate authority. The validity of the certificate should be verified at each verification of the given signature.

Accordingly, there is a need for alternative methods for verifying signatures in a PKI-system.

SUMMARY

According to a first aspect, the invention is embodied as a computer-implemented method for signing a message by a user device of a public key infrastructure (PKI) system. The method comprises sending the message and a user public key to at least one attestation server and receiving from the attestation server a server signature on the message. The server signature attests the validity of the user public key and is bound to the user public key and the message. The method further comprises signing the message and the server signature with a user private key, thereby providing a user signature on the message.

According to another aspect, an attestation server for attesting the validity of a public key of a public key infrastructure (PKI) system for a message to be signed by a user device is provided. The server is configured to receive from the user device the message and a user public key. The server is further configured to check the validity of the user public key and to sign the message with a server secret key of the attestation server, if the user public key is valid at the time of signing. Thereby a server signature is provided. The server signature is bound to the user public key and the message. The server is further configured to send the server signature to the user device.

According to yet another aspect of the invention a computer program product for signing a message by a user device of a public key infrastructure (PKI) system is provided. The computer program product comprises a computer readable storage medium having program instructions embodied therewith. The program instructions are executable by the user device to cause the user device to perform a method comprising sending the message and a user public key to at least one attestation server and receiving from the attestation server a server signature on the message. The server signature attests the validity of the user public key at the execution time of the server signature and is bound to the user public key and the message. The method further comprises signing the message and the server signature with a user private key, thereby providing a user signature on the message.

Embodiments of the invention will be described in more detail below, by way of illustrative and non-limiting examples, with reference to the accompanying drawings.

DETAILED DESCRIPTION

Figure 1:
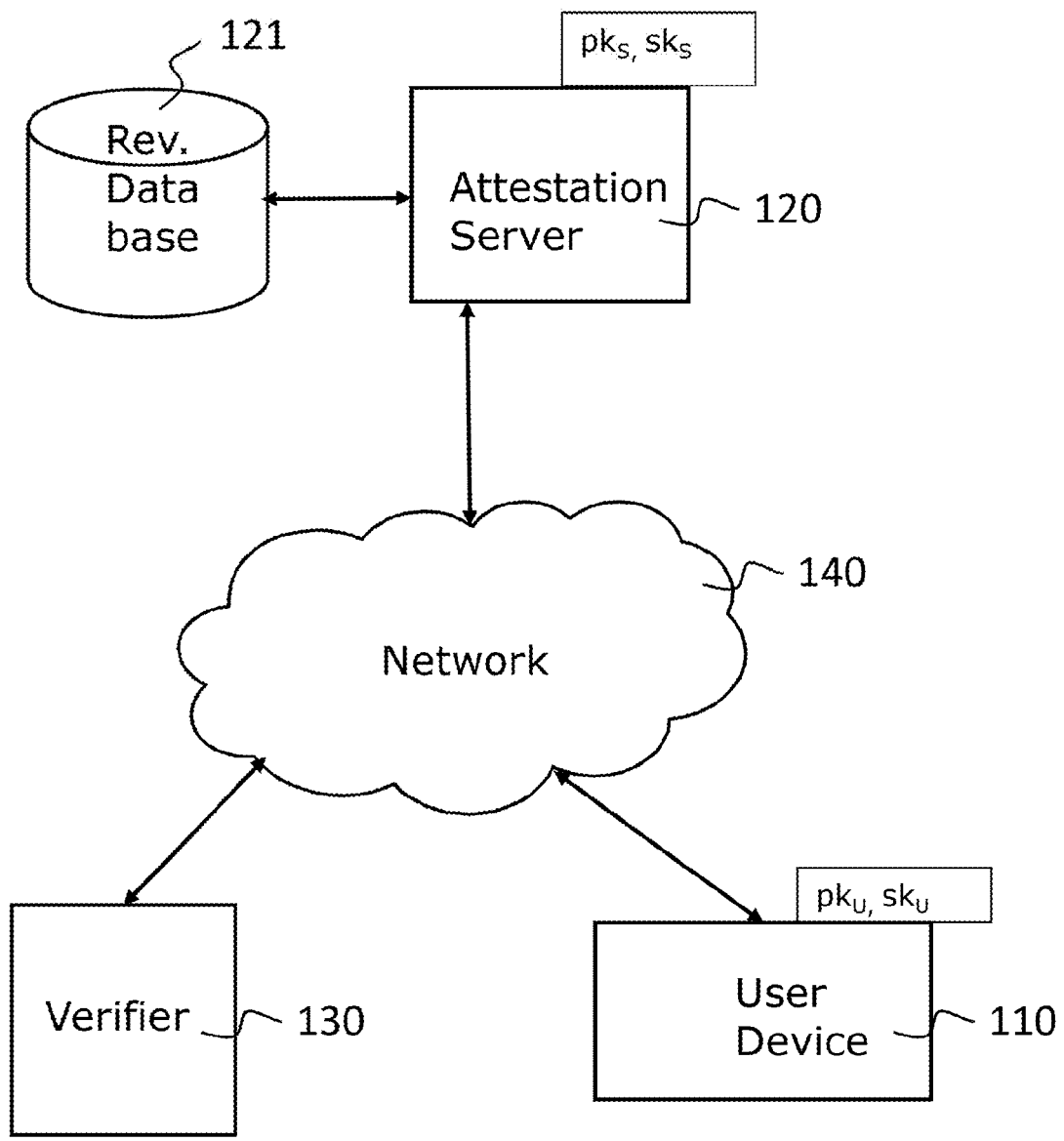
FIG. 1 shows a schematic block diagram of a public key infrastructure (PKI) system according to an embodiment of the invention.

FIG. 1 is a schematic block diagram of a public key infrastructure (PKI) system 100 according to an embodiment of the invention. The system 100 comprises a user device 110 that may be operated by a private or commercial user. The user device 110 and the user respectively have a user public key $pk_u$ and a corresponding user private key $sk_u$. The user private key $sk_u$ may also be denoted as user secret key as it has to be kept secret by the user. The user public key $pk_u$ and the user private key $sk_u$ form a key pair of the PKI system 100. The user device 110 is configured to sign messages with a digital signature according to a computer implemented method according to embodiments of the invention.

The PKI-system 100 further comprises an attestation server 120. The attestation server 120 has a server public key $pk_s$ and a corresponding private key $sk_s$. The server public key $pk_s$ and the server private key $sk_s$ form another key pair of the PKI system 100. The server private key $sk_s$ may also be denoted as server secret key.

The attestation server 120 comprises a revocation database 121 and/or is connected with a revocation database 121. The revocation database 121 is configured to store revocation lists with public keys of the PKI-system 100 that have been revoked and are hence not valid anymore, even though the corresponding public key certificate has not expired. The revocation database 121 may be implemented in various ways. According to one embodiment it may comprise blacklists with user certificates that have been revoked. According to other embodiments it may comprise whitelists with user certificates that have not been revoked.

The PKI-system 100 further comprises a verifier 130. The verifier 130 may be a device of a private or commercial entity that is configured to verify the authenticity of messages received from the user device 110.

The user device 110, the attestation server 120 and the verifier 130 are coupled via a network. 140. The network 140 may be in particular embodied as a wide area network such as the Internet. According to further embodiment the network 140 may encompass also local area networks.

The user device 110, the attestation server 120 and the verifier 130 may communicate via the network 140 with each other. In particular, the user device 110, the attestation server 120 and the verifier 130 may communicate data and messages of a computer-implemented method for performing digital signatures on messages and for verifying these digital signatures.

The attestation server 120 may be generally any server that is trusted by the verifier 130.

According to one embodiment the attestation server 120 may be embodied as certificate authority that is configured to issue digital certificates for public keys. In addition, the attestation server may be configured to act as a central revocation authority that centrally stores and administers information about revoked digital certificates. According to other embodiments the PKI-system 100 may comprise multiple attestation servers 120 that also have information about revoked certificates.

Figure 2:
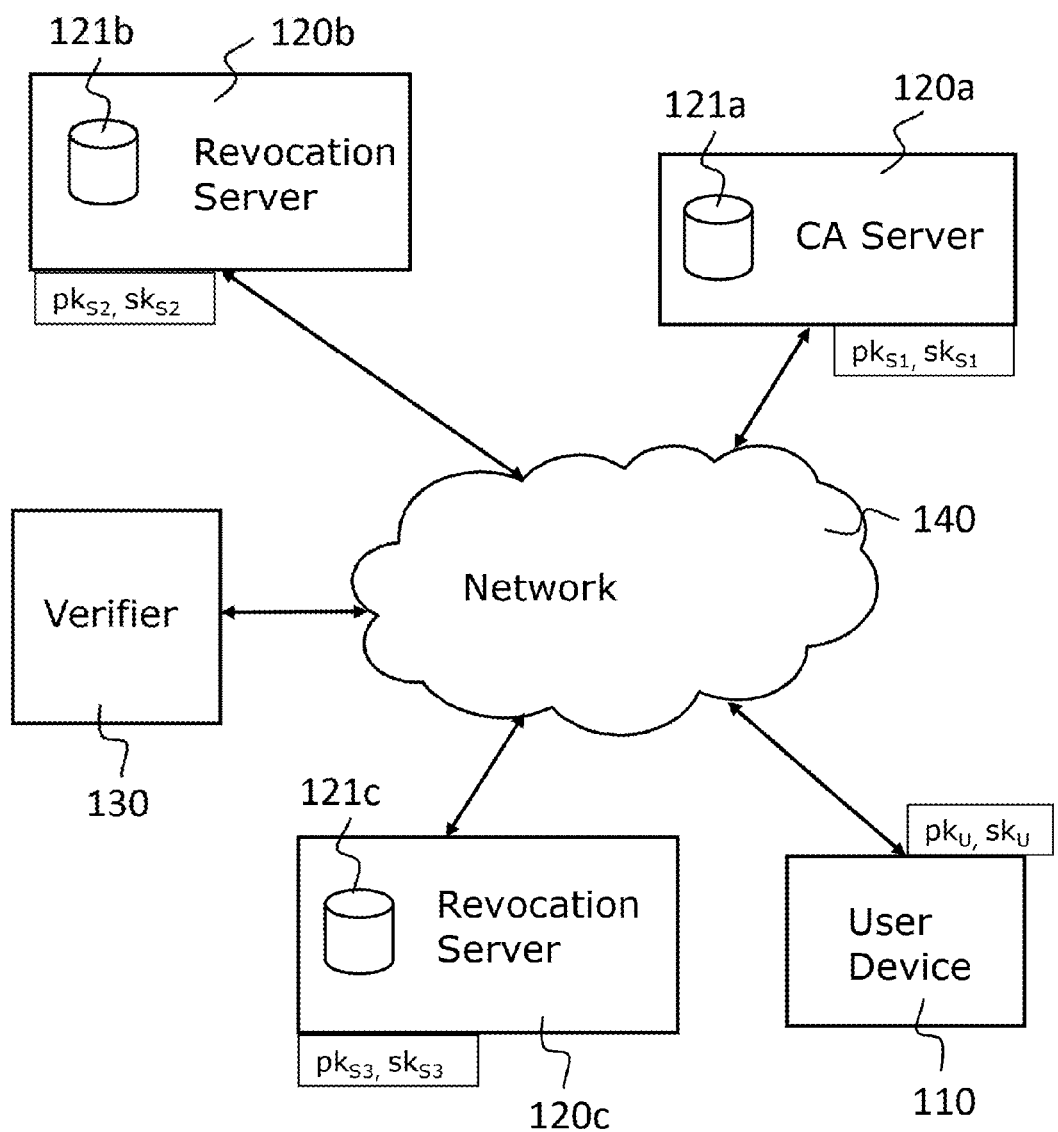
FIG. 2 shows a schematic block diagram of a public key infrastructure (PKI) system according to another embodiment of the invention.

FIG. 2 shows such a PKI-system 200 comprising multiple attestation servers. More particularly, the PKI-system 200 comprises a certificate authority server 120a, a first revocation server 120b and a second revocation server 120c. The certificate authority server 120a comprises a revocation database 121a and/or is connected with the revocation database 121a. The first revocation server 120b comprises a revocation database 121b and/or is connected with the revocation database 121b. The second revocation server 120c comprises a revocation database 121c and/or is connected with the revocation database 121c. The revocation databases 121a, 121b and 121c are configured to store revocation lists with public keys of the PKI-system 100 that have been revoked and are hence not valid anymore.

The certificate authority server 120a, the first revocation server 120b and the second revocation server 120c may all serve as attestation server for the user device 110.

The certificate authority server 120a has a server public key $pk_{s1}$ and a corresponding server private key $sk_{s1}$. The first revocation server 120b has a server public key $pk_{s2}$ and a corresponding server private key $sk_{s2}$. The second revocation server 120b has a server public key $pk_{s3}$ and a corresponding server private key $sk_{s3}$.

The server public keys $pk_{s1}$, $pk_{s2}$ and $pk_{s3}$ and the server private keys $sk_{s1}$, $sk_{s2}$ and $sk_{s3}$, form key pairs of the PKI system 100.

The certificate authority server 120a is device/entity that is configured to issue digital certificates to user devices 110 of the PKI-system 200. If a private key $sk_u$ of the user device 110 has been compromised, the user device 110 can inform the certificate authority 120a about it and revoke the digital certificate and the corresponding user public key $pk_u$. The certificate authority server 120a may store the revocation information received from the user device 120 in the revocation database 121a. It may further distribute the revocation information e.g. as blacklists or white lists, to the first revocation server 120b and the second revocation server 120c. The synchronization between the revocation databases 120a, 120b and 120c may be performed in regular intervals, on demand or in any other desired way.

According to this embodiment the user device 110 may choose the certificate authority server 120a, the first revocation server 120b and/or the second revocation server 120c as attestation server for attesting the validity of the respective user public key. The user device 110 and the user of the user device 110 respectively just have to choose an attestation server that is trusted by the respective verifier 130 to whom the user device 110 wants to authenticate the signature.

Figure 3:
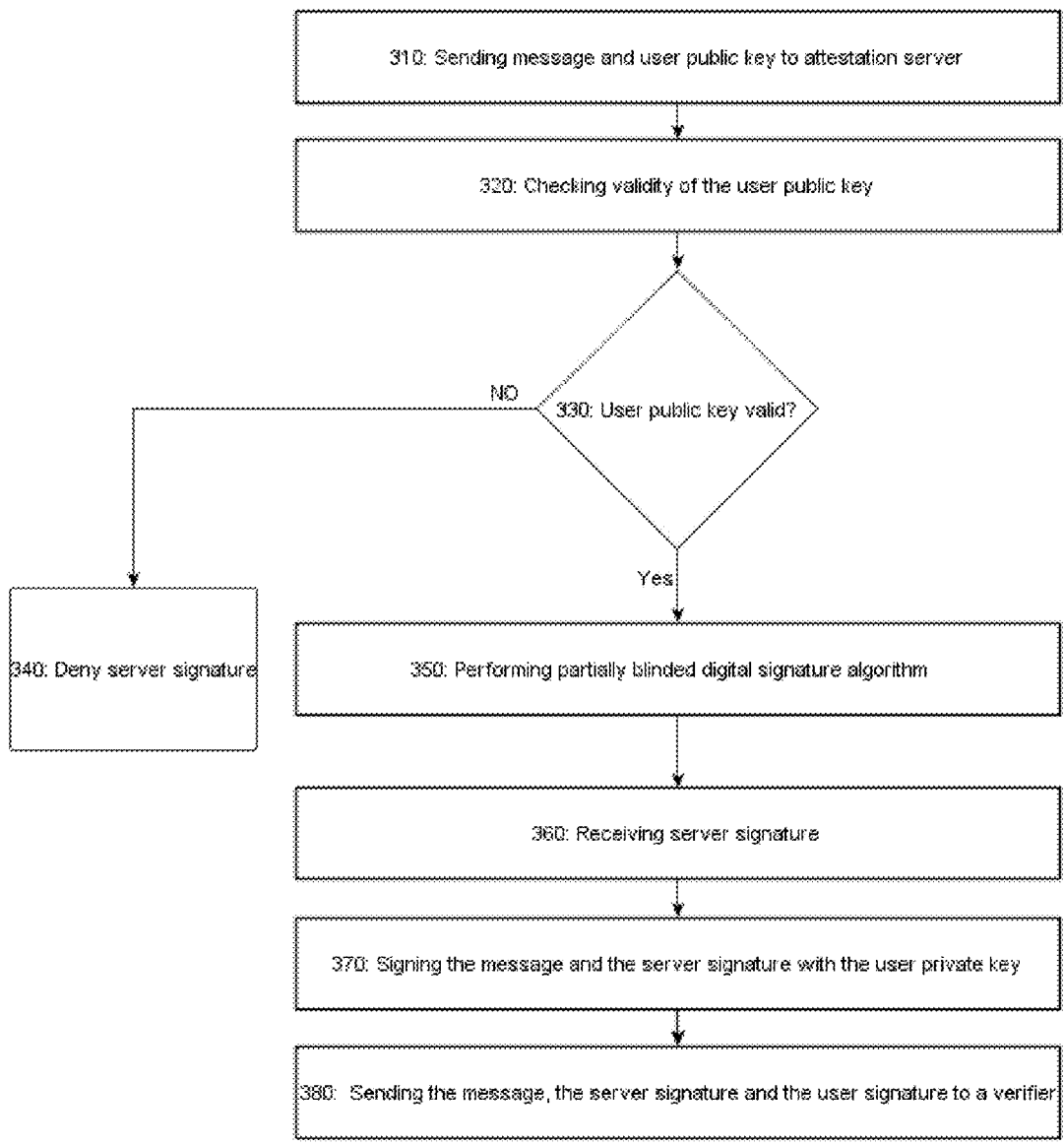
FIG. 3 shows a flow chart of method steps of a computer-implemented method for signing messages by a user device of a PKI-system according to embodiments of the invention.

FIG. 3 shows a flow chart of method steps of a computer-implemented method for signing messages by a user device of a PKI-system according to embodiments of the invention. The computer-implemented method may be e.g. performed in the PKI-system 100 or the PKI-system 200 embodied as described above. Accordingly in the following description of the computer-implemented method it is referred back to the components of the PKI-system 100 and/or the PKI-system 200.

At a step 310, the user device 110 sends a message m and a user public key $pk_u$ to the attestation server 120 of FIG. 1.

At a step 320, the attestation server 120 looks into the revocation database 121 and checks the validity of the user public key $pk_u$ received from the user device 110. More particularly, the attestation server 120 checks whether the user public key $pk_u$ and/or the corresponding digital public key certificate have been revoked.

At a step 330, the attestation server 120 decides whether the received user public key $pk_u$ is valid or not. If it is not valid, i.e. if it has been revoked, the attestation server 120 denies at a step 340 any attestation concerning the validity of the user public key $pk_u$ and denies any corresponding server signature. Accordingly, the computer-implemented method stops and the user device 110 cannot use the revoked public key anymore for verification purposes to the verifier 130.

If at the step 330 the attestation server concludes that the received user public key $pk_u$ is valid, i.e. it has not been revoked, the method 300 proceeds with a step 350.

At the step 350, the user device 110 and the attestation server 120 perform a partially blinded digital signature algorithm. As a result of this partially blinded digital signature algorithm, the attestation server 120 signs the message m with the server private key $sk_s$. Thereby the attestation server 120 provides a server signature $sig_s$ on the message m and the user public key $pk_u$. More particularly, the server signature $sig_s$ is bound to the user public key $pk_u$ According to embodiments the attestation server 120 may add a time stamp $t_{sig}$ to the server signature $sig_s$. The time stamp $t_{sig}$ indicates the execution time of the server signature $sig_s$. The server signature $sig_s$ may be additionally bound to public user information pub related to the message. The user device 110 may decide and control as part of the partly blinded digital signature algorithm which public user information pub shall be revealed to the attestation server 120 and bound to the server signature $sig_s$ on the message m. The public user information pub may comprise e.g. the user public key $pk_u$, a certificate of the user public key, a certification chain of the user public key, information related to the intended verifier of the message, a public key of the intended verifier of the message and/or information allowing the identification of the user public key. As a result of the partially blinded signature algorithm the user device 110 has received, at a step 360, the message m with the server signature $sig_s$. The server signature $sig_s$ attests the validity of the user public key $pk_u$ at the execution time of the server signature $sig_s$.

At a step 370, the user device 110 signs the message m and the server signature $sig_s$ on the message m with the user private key $sk_u$, thereby providing a user signature $sig_u$.

Then at a step 380, the user device 110 sends the message m, the server signature $sig_s$ and the user signature $sig_u$ to the verifier 130. This allows the verifier 130 to verify the user signature $sig_u$ without having to verify separately the validity of the user public key $pk_u$.

According to embodiments verification includes authentication of the user signature $sig_u$, non-repudiation of the user signature $sig_u$ and integrity of the message m.

As illustrated above, if a certificate for a user public key $pk_u$ is revoked, the attestation server 120 will not provide a server signature $sig_s$ on the corresponding user public key $pk_u$ anymore and any verification of the user signature $sig_u$ will fail due to that missing server signature $sig_s$. Furthermore, as a user signature can only be created if at least one attestation server is willing to contribute and to provide a server signature, correctly generated user signatures can remain valid even if the corresponding public key certificate will be revoked later, i.e. after the generation of the server signature.

Figure 4:
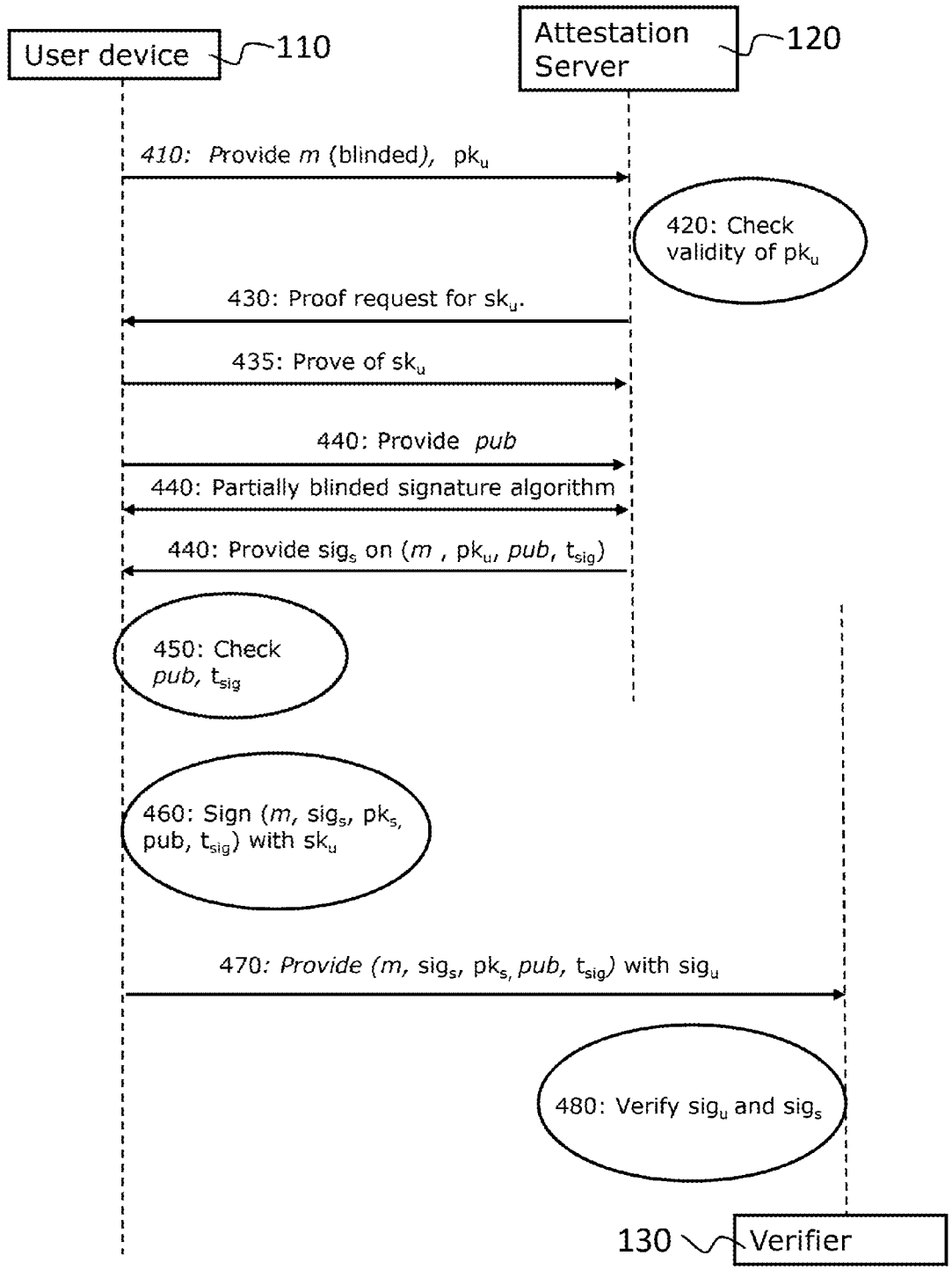
FIG. 4 shows a more detailed message flow of a method embodying the invention.

Now with reference to FIG. 4, a more detailed message flow of a method embodying the invention between the user device 110, the attestation server 120 and the verifier 130 is provided.

At a step 410, the user device 110 sends the message m and the user public key $pk_u$ to the attestation server 120. According to embodiments the message m is partly blinded so that only specific public user information pub is revealed to the attestation server 120.

At a step 420, the attestation server 120 looks into the revocation database 121 and checks the validity of the user public key $pk_u$ received from the user device 110. More particularly, the attestation server 120 checks whether the user public key $pk_u$ and a corresponding digital certificate cert has been revoked. If the user public key $pk_u$ has been revoked, the attestation server 120 would stop the message flow and deny any server signature. In this example it is assumed that the user public key $pk_u$ was found to be valid or in other words that it was not revoked.

At a step 430, the attestation server 120 sends a request to the user device 110 to prove knowledge of the private user key $sk_u$. In a step 435, the user device 110 proves knowledge of the private user key $sk_u$ to the attestation server 120. The steps 430 and 435 may be an interactive proof protocol as generally known in the art. If the proof is successful, the method continues with a step 440. Otherwise the attestation server 120 may cancel the attestation.

At the step 440, the user device 110 and the attestation server 120 perform a partially blinded digital signature algorithm. It should be noted that also the step 410 may already be considered as part of the partly blinded digital signature algorithm. As a result of this partly blinded digital signature algorithm, the attestation server 120 signs the message m with the server private key $sk_s$ and binds the server signature $sig_s$ to the user public key $pk_u$. By signing the message m, the server affirms that the received user public key $pk_u$ was valid at the time of signing. In addition, the server signature $sig_s$ may be bound to public user information pub that has been revealed by the user as part of the partly blinded signature algorithm. Thereby the attestation server 120 provides the server signature $sig_s$ on the message m, the user public key $pk_u$ and the public user information pub. In addition, according to embodiments the attestation server 120 adds a time stamp $t_{sig}$ to the server signature $sig_s$ that indicates the execution time of the server signature $sig_s$. As a result of the step 440 the message m with the server signature $sig_s$ is received by the user device 110. The server signature $sig_s$ is bound to the user public key $pk_u$, the public user information pub as well as the time stamp $t_{sig}$. The public user information pub may be in particular a public key certificate of the user public key.

At a step 450, the user device 110 checks the received public information pub for correctness. In addition, it may also check whether the time-stamp $t_{sig}$ is in a reasonable time frame.

If all is correct, at a step 460, the user device 110 signs the message m, the server signature $sig_s$, the server public key $pk_s$ and the public user information pub with the user private key $sk_u$, thereby providing a user signature $sig_u$.

At a step 470, the user device 110 sends the message m, the server signature $sig_s$, the server public key $pk_s$ and the public user information pub as well as with the user signature $sig_u$, to the verifier 130.

At a step 480, the verifier 130 receives the message m, the server signature $sig_s$, the server public key $pk_s$ and the public user information pub, signed with the user private key $sk_u$, and performs a verification of the user signature $sig_u$ and the server signature $sig_s$ for correctness. Accordingly, the verifier 130 can verify the user signature $sig_u$ and the server signature $sig_s$ locally without having to verify separately the validity of the user public key $pk_u$ with a certificate authority.

According to embodiments the added time-stamps $t_{sig}$ can be used for a fine-grained revocation scheme for the user signatures. More particularly, embodiments of the invention allow to address the time-gap between the point in time at which the user private key was compromised and the point in time at which the corresponding user public key was revoked.

In this respect, the attestation server 120 is according to embodiments configured to publish revocation lists with a key revocation time stamp. The key revocation time stamp comprises a point in time at which the corresponding public key was revoked. Hence according to such embodiments all user signatures that were generated before the point in time specified by the revocation time stamp remain valid, while all other signatures that have been generated thereafter are not valid and would be rejected by a verifier. The revocation time stamp can be chosen such that the user is sure that at the chosen point in time the corresponding user private key was not compromised yet.

Embodiments of the invention may provide the advantage that the certificate authority is not needed for the signature verification. This reduces the load on the certificate authority. Furthermore, it improves scalability as any attestation server may be used that is trusted by the verifier.

Embodiments of the invention may provide the additional advantage that user signatures can still be generated if no connection to any attestation server 120 is available. In this case other known revocation mechanisms may be used.

In the following, a more detailed embodiment of the cryptographic scheme that may be used according to embodiments of the invention is provided.

For embodiments of the invention assumptions as follows may be made:

$\lambda$ is used as security parameter. $1^\lambda$ is the string of $\lambda$ ones, indicating key strength.

$a \leftarrow S$ denotes that a is assigned a random element chosen uniformly from the set S. If A is a polynomial time algorithm we write $y \leftarrow A(x; r)$ to denote that y is assigned the output of A with input x and external random coins r. If we drop r, the random coins are drawn internally. A function $\varepsilon: \mathbb{N} \to \mathbb{R}$ is negligible if $\varepsilon(\lambda) = \lambda^{-\omega(1)}$.

For embodiments of the invention a general (standard) digital signature scheme DSIG as well as a blinded and in particular a partly blinded digital signature scheme may be used.

A general digital signature scheme according to embodiments of the invention consists of the algorithms KeyGen, Sign, and Verify.

In particular, DSIG:=(KeyGen; Sign;Verify) are chosen as described in the following.

The algorithm KeyGen outputs the public key pk and the private key sk of the signer, where $\lambda$ is the security parameter:

$(pk;sk) \leftarrow \text{KeyGen }(1^\lambda)$

The algorithm Sign gets as input the private key sk and the message $m \varepsilon M$ to sign, where M is the message space. It outputs a signature $\sigma$:

$\sigma \leftarrow \text{Sign}(sk;m)$

The algorithm Verify outputs a decision bit $d\varepsilon\{0; 1\}$, indicating the validness of the signature $\sigma$, w.r.t. pk and m. 1 stands for a valid signature, while 0 indicates an invalid signature. In particular:

$d \leftarrow \text{Verify}(pk;m;\sigma)$

For each DSIG it is required according to embodiments that the correctness properties hold. Moreover, it is required according to embodiments that the signature scheme is unforgeable.

Blind signatures were introduced in "Blind signatures for untraceable payments", David Chaum, Ronald L. Rivest, and Alan T. Sherman, editors, Advances in Cryptology: Proceedings of 7 CRYPTO '82, Santa Barbara, Calif., USA, Aug. 23-25, 1982, pages 199-203, Plenum Press, New York, 1982.

Blind signatures allow that a user device obtains a signature on message m from a server-attestation server while the server (i.e. the signer) is not able to derive any information about m or the resulting server signature $\sigma$.

According to embodiments a partially blinded signature algorithm is performed between the user device and the attestation server. Such a partially blinded signature algorithm allows the user/user device to add "public" user information pub related to the message m to the signature that can be seen by the attestation server (i.e. the signer). In other words, the partially blinded signature algorithm allows the user/user device to reveal only selected information of the message m that can be seen by the attestation server and signer respectively.

Embodiments of the invention comprise a partially blinded signature scheme BSIG consisting of three algorithms as follows:

BSIG:=(KeyGen;Verify;(U;S))such that:

The algorithm KeyGen outputs the server public key and the server private key, wherein $\lambda$ is the security parameter:

$(pk;sk) \leftarrow \text{KeyGen}(1^\lambda)$

The algorithm Verify outputs a decision bit $d\varepsilon\{0, 1\}$, indicating the validness of the signature $\sigma$, w.r.t. pk, m and pub, where $\lambda$ is the security parameter. 1 stands for a valid signature, while 0 indicates an invalid signature. In particular:

$d \leftarrow \text{Verify}(pk;m;pub;\sigma)$

The algorithm $<U(m, pk), S(pub, sk)>$ is an interactive algorithm between a signer S and a requester U of the signature. The requester U chooses the message m, while the signer S (attestation server) holds a private key sk and can add additional public information pub to the signature:

$((\sigma, pub), \bot) \leftarrow U(m,pk);S(pub,sk))$

This means that after the protocol has ended, the attestation server receives no information $\bot$ while the user has a valid signature on m and pub under the public key pk of the attestation server.

In addition, according to embodiments further security and correctness requirements may be provided. In particular, the further security requirements are blindness and one-more unforgeability.

According to further embodiments unlinkability may be required to add additional privacy. The latter may be in particular useful for embodiments that do not provide a time-stamp.

According to embodiments that do not provide blindness or partial blindness, standard digital signature schemes may be used.

According to embodiments it is assumed that the user device 110 or rather the user of the user device 110, trusts at least one attestation server 120 of the PKI-system. The attestation server 120 has its own key pair of a partially blind signature scheme, where the corresponding server public key $pk_s$ is certified.

Hence, the server holds $(sk_s;pk_s) \leftarrow \text{BSIG.KeyGen}(1^\lambda)$

Certified public keys are provided already in standard PKI environments for normal signatures. Moreover, the attestation server knows which user public keys $pk_u$ are revoked.

For simplicity of illustration, it is assumed in the following that the server signature $sig_s$ is executed by only one attestation server.

However, according to other embodiments, also a plurality of attestation servers may execute the server signature in a combined fashion. According to the latter embodiment the output from the first protocol run is used as input for the next protocol run in an iterative manner. In other words, for each attestation server to sign, the last output is used as input. According to another embodiment threshold partially blind signature schemes may be used. Threshold partially blind signature schemes are e.g. disclosed by Sherman S. M. Chow, Lucas Chi Kwong Hui, Siu-Ming Yiu, and K. P. Chow in "Two improved partially blind signature schemes from bilinear pairings" in Colin Boyd and Juan Manuel Gonzalez Nieto, editors, Information Security and Privacy, 10th Australasian Conference, ACISP 2005, Brisbane, Australia, Jul. 4-6, 2005, Proceedings, volume 3574 of Lecture Notes in Computer Science, pages 316-328, Springer, 2005.

More particularly, schemes according to embodiments of the invention may be provided as follows:

In a first step, the user device 110 generates a key pair of a standard digital signature scheme:

$$(pk_u; sk_u) \leftarrow \text{DSIG.KeyGen}(1^\lambda).$$

In a next step, the user device 110 registers the user public key $pk_u$ at the attestation server 120. Also, a corresponding user public key certificate is generated by either the attestation server 120 or additional Certificate Authorities (CAs) to have additional attributes bound to the user public key $pk_u$.

In a subsequent step, the user device 110 sends $pk_u$ and the message m to be signed to the attestation server 120 and runs with the attestation server 120 the partially blind signature algorithm (U (m, $pk_u$), S(pub, $sk_s$)).

In a next step, the attestation server 120 checks the validity of the user public key $pk_u$. More particularly, it checks whether the user public key $pk_u$ has been revoked. If the user public key $pk_u$ has been revoked, the attestation server 120 stops the participation in the partially blind signature algorithm.

If the user public key $pk_u$ is valid, the attestation server sets pub←($pk_u$; $t_{sig}$), where $t_{sig}$ is the current time-stamp of the server signature. According to embodiments the attestation server may add the user certificate to pub.

According to further embodiments the user may indicate whether a time-stamp $t_{sig}$ is to be added. According to further embodiments no time stamp is added.

In a next step the user device 110 receives the server signature σ (also denoted as $sig_s$) and pub and checks it for correctness. According to embodiments it may also check if the time-stamp $t_{sig}$ is in a reasonable frame.

In a next step the user device 110 signs the server signature σ, the message m, the public key of the server $pk_s$ and the public user information pub, thereby generating a user signature σ' (also denoted as $sig_u$):

$$\sigma' \leftarrow \text{DSIG.Sign}(sk_u, (\sigma; m; pk_s; pub)).$$

To verify whether the user signature σ' is correct, the verifier 130 can check if $$\text{DSIG.Verify}(pk_u, (\sigma, m, pk_s, pub), \sigma') = 1, \text{while also}$$

$$\text{BSIG.Verify}(pk_s, m, pub, \sigma) = 1.$$

Additionally, the verifier 130 may also check the time-stamp $t_{sig}$ and the certificate.

According to embodiments using the partially blinded signature scheme, the one or more attestation servers do not learn which message m is signed.

According to other embodiments blindness may not be required. In such a case a standard digital signature scheme may be used.

It should be noted that the references cited above are just examples of blinded signature schemes that may be used according to embodiments of the invention. Generally any partly blinded signature schemes that have the properties described above may be used according to embodiments of the invention.

Embodiments of the invention provide that an adversary cannot generate any signature for the user/user device, as the adversary does not know the user private key $sk_u$. The attestation server 120 is also secure due to the one-more unforgeability of the blind signature scheme. Hence, once a public key $pk_u$ is revoked, no additional signatures can be generated, as long as the adversary has not full access to one of the servers blindly signing the message. Moreover, only the verifier 130 needs to trust the chosen attestation server or the chosen attestation servers.

According to embodiments there may be more than one attestation server, while the user device or rather the user of the user device is not bound to a specific server (set). This may provide the advantage that outages are not as severe.

Figure 5:
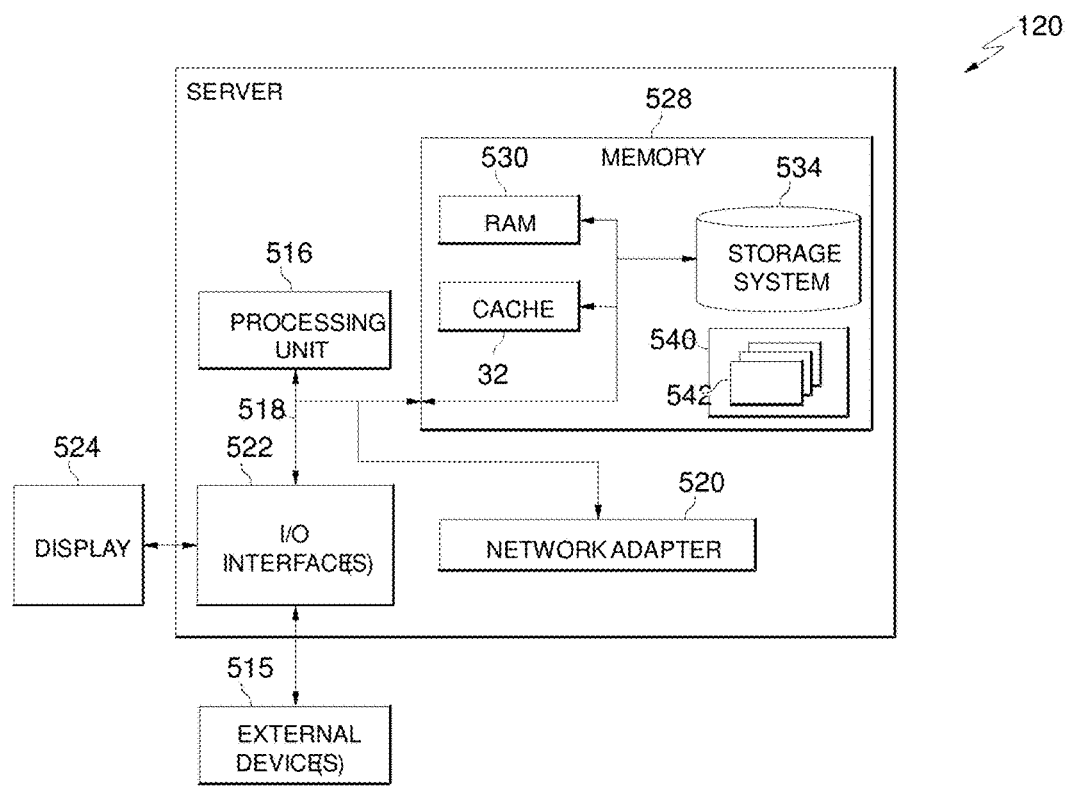
FIG. 5 shows a more detailed block diagram of an attestation server according to an embodiment of the invention.

Referring now to FIG. 5, a more detailed embodiment of the attestation server 120 is illustrated. The attestation server 120 is operational with numerous other general purpose or special purpose computing system environments or configurations. Examples of well-known computing systems, environments, and/or configurations that may be suitable for use with attestation server 120 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. In particular the server 120 is operational with other servers of a PKI-system and user devices of a PKI-system.

Attestation server 120 may be described in the general context of computer system-executable instructions, such as program modules, being executed by a computer system. Generally, program modules may include routines, programs, objects, components, logic, data structures, and so on that perform particular tasks or implement particular abstract data types. Attestation server 120 is shown in the form of a general-purpose computing device. The components of server 120 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Server 120 typically includes a variety of computer system readable media. Such media may be any available media that is accessible by server 120, and it includes both volatile and non-volatile media, removable and non-removable media.

System memory 528 can include computer system readable media in the form of volatile memory, such as random access memory (RAM) 530 and/or cache memory 532. Server 120 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Server 120 may also communicate with one or more external devices 515 such as a keyboard, a pointing device, a display 524, etc.; one or more devices that enable a user to interact with server 120; and/or any devices (e.g., network card, modem, etc.) that enable server 120 to communicate with one or more other computing devices. Such communication can occur via Input/Output (I/O) interfaces 522. Still yet, server 120 can communicate with one or more networks such as a local area network (LAN), a general wide area network (WAN), and/or a public network (e.g., the Internet) via network adapter 520. As depicted, network adapter 520 communicates with the other components of server 120 via bus 518. It should be understood that although not shown, other hardware and/or software components could be used in conjunction with server 120. Examples, include, but are not limited to: microcode, device drivers, redundant processing units, external disk drive arrays, RAID systems, tape drives, and data archival storage systems, etc.

Figure 6:
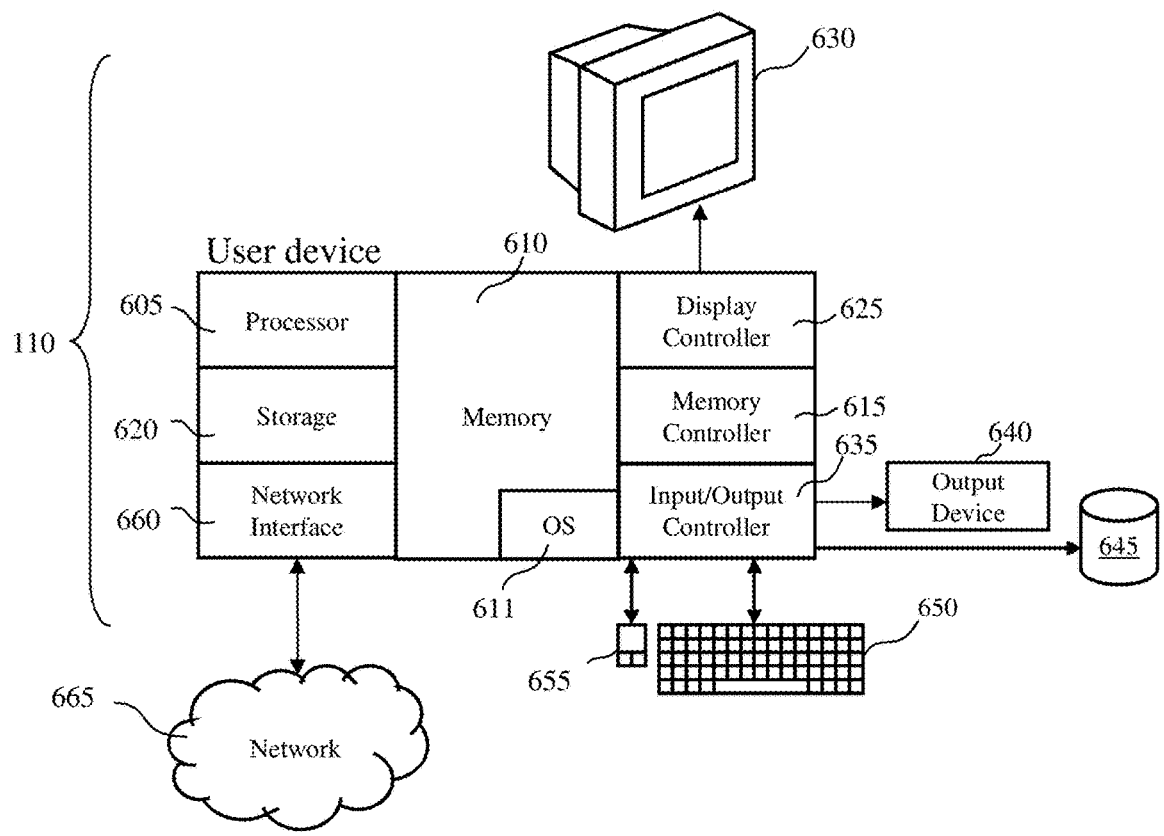
FIG. 6 shows a more detailed block diagram of a user device according to an embodiment of the invention.

FIG. 6 shows a schematic block diagram of system 600 comprising a more detailed embodiment of a user device 110. According to this example the user device 110 is illustrated as desktop computer. In exemplary embodiments, in terms of hardware architecture, as shown in FIG. 6, the user device 110 includes a processor 605, memory 610 coupled to a memory controller 615, and one or more input and/or output (I/O) devices 640, 645, 650, 655 (or peripherals) that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), or generally any device for executing software instructions.

The memory 610 can include any one or combination of volatile memory elements (e.g., random access memory) and nonvolatile memory elements. Moreover, the memory 610 may incorporate electronic, magnetic, optical, and/or other types of storage media. Note that the memory 610 can have a distributed architecture, where various components are situated remote from one another, but can be accessed by the processor 605.

The software in memory 610 may include one or more separate programs, in particular a program for signing a message by a user device of a public key infrastructure (PKI) system according to embodiments of the invention. In the example of FIG. 6, the software in the memory 610 includes methods described herein in accordance with exemplary embodiments and a suitable operating system (OS) 66. The OS 611 essentially controls the execution of other computer programs, such as the methods as described herein, and provides scheduling, input-output control, file and data management, memory management, and communication control and related services.

Possibly, a conventional keyboard 650 and mouse 655 can be coupled to the input/output controller 635 (in particular for the BS, if needed). Other I/O devices 640-655 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 635 for further processing.

In addition, the I/O devices 640-655 may further include devices that communicate both inputs and outputs. The system 600 can further include a display controller 625 coupled to a display 640. In exemplary embodiments, the system 600 can further include a network interface or transceiver 660 for coupling to a network 665.

The network 665 transmits and receives data between the user device 110 and external systems, in particular the attestation server 120 the verifier 130 as described above. The network 665 is possibly implemented in a wireless fashion, e.g., using wireless protocols and technologies, such as WiFi, WiMax, etc. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 665 can also be an IP-based network for communication between the unit 601 and any external server, client and the like via a broadband connection, in particular with an attestation server 120 and a verifier 130 as described above. In exemplary embodiments, network 665 can be a managed IP network administered by a service provider. Besides, the network 665 can be a packet-switched network such as a LAN, WAN, Internet network, etc.

If the user device 110 is a PC, workstation, smartphone, intelligent device or the like, the software in the memory 610 may further include a basic input output system (BIOS). The BIOS is stored in ROM so that the BIOS can be executed when the user device 110 is activated.

When the user device 110 is in operation, the processor 605 is configured to execute software stored within the memory 610, to communicate data to and from the memory 610, and to generally control operations of the computer 601 pursuant to the software. The methods described herein, in whole or in part, are read by the processor 605, typically buffered within the processor 605, and then executed.

The present invention may be a system, a method, and/or a computer program product. The computer program product may include a computer readable storage medium (or media) having computer readable program instructions thereon for causing a processor/processing unit of the attestation server 120 and/or the user device 110 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method for signing a message by a user device of a public key infrastructure (PKI) system, the method comprising:
    sending the message and a user public key from the user device directly to a first attestation server;

signing the message by the first attestation server with a first signature, in response to the user public key being valid at the time of signing, the first signature attesting the validity of the user public key;

sending the message from the first attestation server directly or indirectly to a second attestation server;

receiving at the user device directly from the second attestation server the message and a server signature on the message, wherein the server signature attests the validity of the user public key and wherein the server signature is bound to the user public key and the message, wherein the server signature includes the first signature from the first attestation server attesting the validity of the user public key and the server signature attests the validity of the first signature, wherein the server signature is bound to the first signature; and signing the message and the server signature with a user private key, thereby providing a user signature on the message.

2. The computer-implemented method according to claim 1, further comprising:

receiving from the second attestation server a time stamp to the server signature, the time stamp indicating the execution time of the server signature.

3. The computer-implemented method according to claim 1, further comprising:

performing a partially blinded digital signature algorithm between the user device and at least one of the attestation servers.

4. The computer-implemented method according to claim 3, wherein performing the partially blinded signature algorithm comprises:

providing public user information related to the message to the first attestation server; and receiving the server signature, wherein the public user information is bound to the server signature.

5. The computer-implemented method according to claim 4, wherein, in said providing step, said public user information comprises at least one of:

the user public key;
a certificate of the user public key;
a certification chain of the user public key;
information related to a verifier of the message;
a public key of the verifier of the message; and
information allowing identification of the user public key.

6. The computer-implemented method according to claim 3, wherein the partly-blinded digital signature algorithm is performed in such a way that different signatures are unlinkable to each other for each of the attestation servers.

7. The computer-implemented method according to claim 1, further comprising:

sending the message, the server signature and the user signature to a verifier for verification of the user signature; and verifying, by the verifier, the user signature and the server signature.

8. A system of attestation servers for attesting the validity of a public key of a public key infrastructure (PKI) system for a message to be signed by a user device, the system comprising:

a first attestation server that is configured to:
receive, directly from the user device, the message and a user public key;
check the validity of the user public key;
sign the message with a server secret key of the first attestation server, in response to the user public key being valid at the time of signing, thereby providing a first signature attesting the validity of the user public key, wherein the first signature is bound to the user public key and the message; and
send the message, the user public key, and the first signature to a second attestation server; and a further attestation server, which is one of the second attestation server or another server of the system, that is configured to:
receive the message, the user public key, and a signature incorporating the first signature;
check the validity of the user public key;
sign the message with a server secret key of the further attestation server, in response to the user public key being valid at the time of signing, thereby providing a further signature attesting the validity of the user public key and of the first signature, wherein the further signature is bound to the user public key, the message, and the first signature; and
send to the user device directly from the further attestation server a server signature that incorporates the first signature and the further signature.

9. The system of attestation servers according to claim 8, at least one of the servers being configured to:

add a time stamp to the server signature, the time stamp indicating the generation time of the server signature.

10. The system of attestation servers according to claim 8, at least one of the servers being configured to:

perform a partially blinded digital signature algorithm with the user device.

11. The system of attestation servers according to claim 10, at least one of the servers being configured to:

receive public user information related to the message from the user device; and bind the public user information to the server signature.

12. The system of attestation servers according to claim 8, at least one of the servers being configured to:

publish revocation lists with a key revocation time stamp, the key revocation time stamp indicating the time at which the corresponding public key was revoked.

13. The system of attestation servers according to claim 8, wherein at least one of the servers is a certificate authority server of the public key infrastructure system.

14. The system of attestation servers according to claim 8, wherein at least one of the servers is a revocation server of the public key infrastructure system, the revocation server being configured to receive revocation information about revoked certificates from a certificate authority server.

15. The system of attestation servers according to claim 8, wherein at least one of the servers is configured to ask the user device to prove possession of the user secret key.

16. The system of attestation servers according to claim 8, at least one of the servers being configured to check the validity of the user public key by carrying out at least one of:

checking, as a central certification authority, whether the user public key is valid; and checking a revocation list comprising a set of revoked user public keys.

17. A non-transitory computer readable medium comprising computer executable instructions which when executed by a user device of a public key infrastructure (PKI) system cause the user device to perform a method for signing a message by the user device of the public key infrastructure (PKI) system, said method comprising the steps of:

sending the message and a user public key to a first attestation server;

receiving from a second attestation server a server signature on the message, wherein the server signature attests the validity of the user public key at the execution time of the server signature and wherein the server signature is bound to the user public key and the message, wherein the server signature includes a first signature from the first attestation server, which attests the validity of the user public key, and the server signature is bound to the first signature and attests the validity of the user public key and of the first signature; and signing the message and the server signature with a user private key, thereby providing a user signature on the message.

18. The computer program product according to claim 17, wherein the computer executable instructions further cause the user device to perform the additional method step of:

performing a partially blinded digital signature algorithm between the user device and at least one of the attestation servers.

* * * * *